May 1, 1934.  A. WEISSENBURGER  1,957,187
WEIGHING AND PRICE COMPUTING APPARATUS
Filed Sept. 23, 1931   2 Sheets-Sheet 1

Patented May 1, 1934

1,957,187

UNITED STATES PATENT OFFICE 1,957,187

WEIGHING AND PRICE COMPUTING APPARATUS

Adolf Weissenburger, Evilard, near Biel, Switzerland

Application September 23, 1931, Serial No. 564,660
In Germany September 23, 1930

8 Claims. (Cl. 235—61)

This invention relates to weighing apparatus having means for automatically computing the price of the article weighed and for printing the amount computed.

The known art at the present time, as regards the manufacture of weighing apparatus may be summarized to the effect that weighing apparatus are quite usual, in which, in association with the weighing operation, indication of the weight is provided by means of pointers, discs, rollers, etc., or by printing the weight on a card, or in which the price may be obtained by reference to a price chart. A weighing apparatus, however, in which the price of the article is computed automatically and the amount in question printed on a card has not as yet been successfully produced owing to the lack of a proper basis for the computation and its development in practice, or owing to the fact that the basis employed is arithmetically incorrect.

The invention accordingly relates to a weighing apparatus of the price-indication type constructed on a novel and accurate basis.

Figure 1:
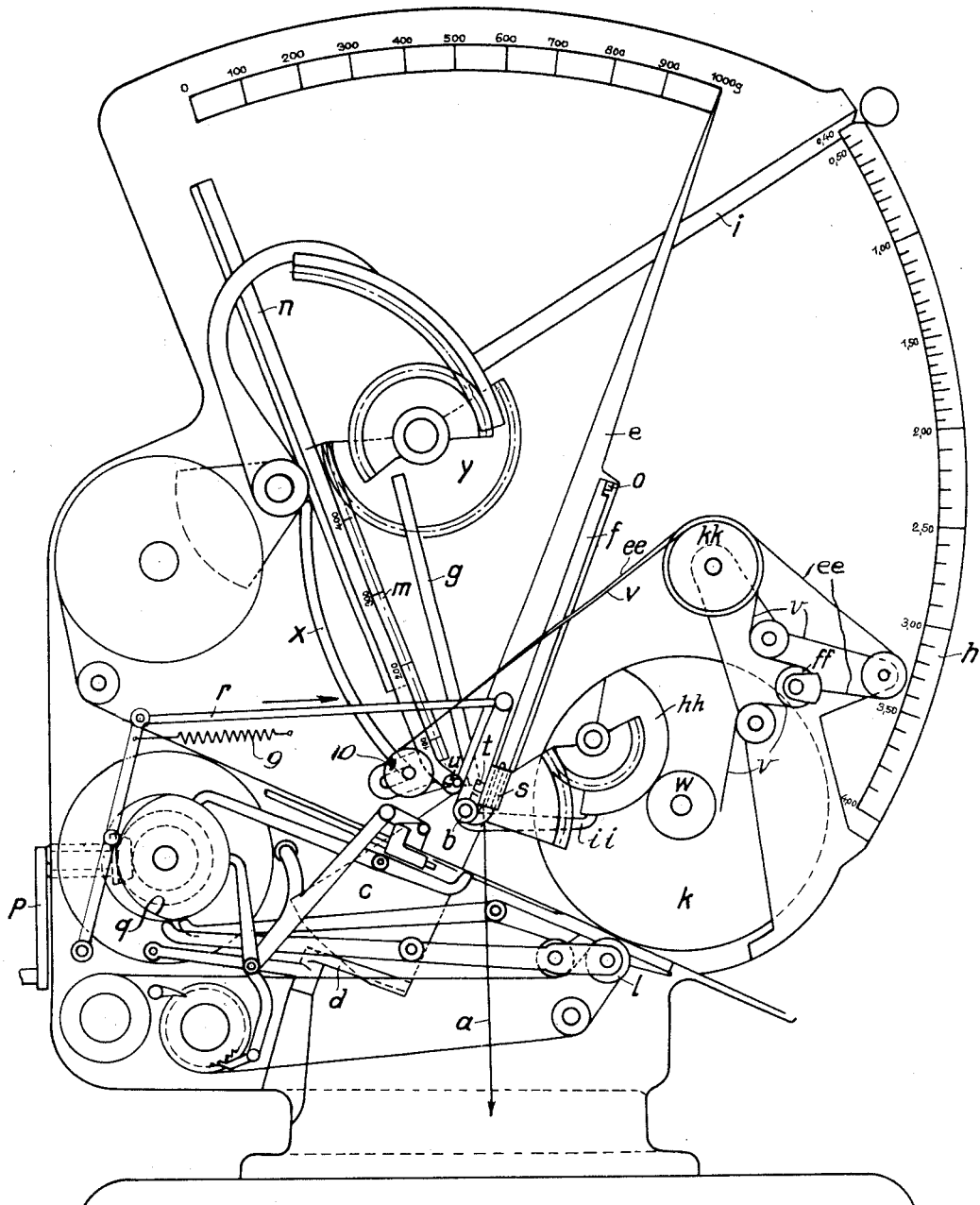
Figure 2:
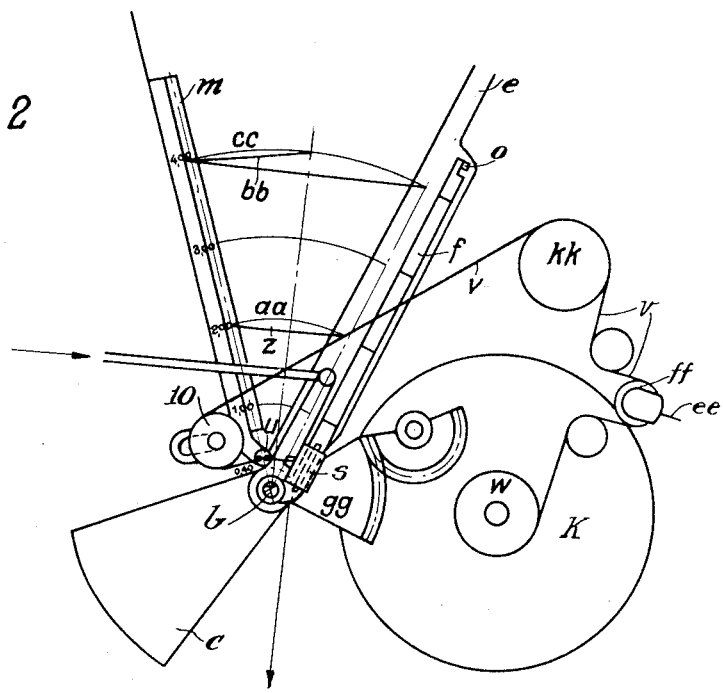
Figure 3:
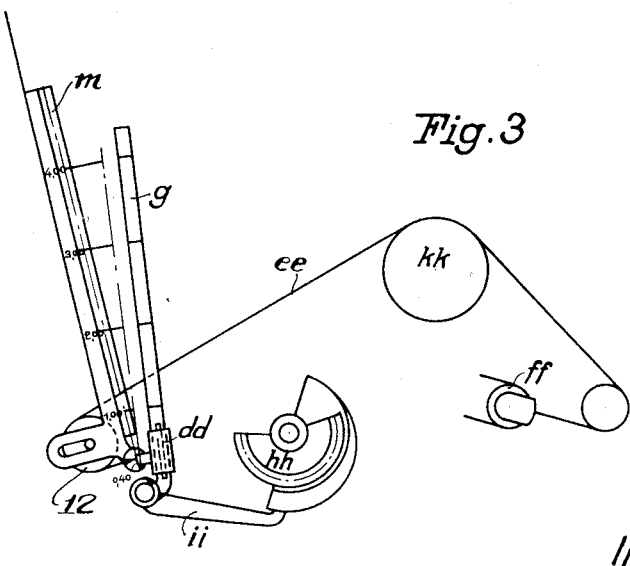

The invention will now be described more fully with reference to the accompanying drawings, in which Fig. 1 is a diagrammatical view of the upper part of the apparatus omitting the actual weighing portion, Figs. 2 and 3 showing details of the construction.

Referring now to the drawings, the actual weighing portion of the apparatus may be of the usual kind. The arrow $a$ indicates the force applied by the weighing load to the lever mechanism of the pointer, this force acting in a downward direction.

The applied force $a$ acts on a pendulum or inclination weight $c$ to rock it and the pointer $e$ rigid therewith in a clockwise direction. The pendulum and pointer are pivoted in the usual manner on a knife edge bearing $b$ (see Patent 970,442). Clamping jaws $d$ act on opposite sides of the pendulum weight to lock it in position and consequently hold the pointer $e$ stationary when the actual weighing operation has been completed and the computing and printing operation commences. A pair of rods $f$ and $g$ are separately mounted for independent rotation on a shaft in back of and in line with the knife edge bearing of the pendulum and pointer assembly. The basis adopted for the computation is as follows: On the graduated section $h$ there is adjusted the price per unit, for example per pound, by means of the lever $i$. On the printing wheel $k$ there is provided a series of raised figures, commencing with the lowest selling price per article, for example 2 cents, and increasing from cent to cent about the periphery up to the maximum price, which according to the drawings is assumed to be 2 lbs. at $1.00 per pound = $2.00—equal increments of prices being represented by equally spaced successive figures.

Viewed from the printing roller $l$ a complete revolution of the printing wheel will result in a price of $2.00 = 2 lbs. at $1.00 per lb., a half-revolution in a price of $1.00 = 1 lb. at $1.00 per lb. or 2 lbs. at 50 cents per lb., and a quarter-revolution in a price of 50 cents or ½ lb. at $1.00, or 1 lb. at 50 cents, or 2 lbs. at 25 cents per lb. It will be obvious, therefore, that if the printing wheel can be so rotated that its angle of movement evenly increases or decreases according to the result derived from weight and price, the correct figure will always move in front of the printing roller.

In present-day weighing apparatus of the inclination type, on which the apparatus according to the invention is also based, the graduation of the chart is perfectly even despite the inclination weight, this being obtained by a cam and, passing thereover, a band, from which is suspended the load. Each fraction of weight accordingly corresponds with a certain angle of the pointer. (See Patent 970,442, above mentioned.) The pointer $e$, when moved by the load travels through different angles varying in degree in proportion to the magnitude of the load. The angle of movement is bounded at one side by the pointer when in zero position which is also coincident with the position of a rack $m$ slidable along a guide bar $n$. The other side of the angle is bounded by the pointer in the position to which it has been moved clockwise by the load. The pointer has an abutment $o$, against which, under the action of a spring 9 the rod $f$ is forced (after the braking of the pointer $e$ by clamping jaws $d$) by rotation of the crank $p$ by means of the cam $q$ cooperating with linkage $r$. The linkage $r$ is moved by the spring 9 in the direction of the arrow and is connected to rod $f$ to move it clockwise until the upper notched end of the rod $f$ engages abutment $o$ on the pointer $e$. The spring actuation of rod $f$ permits it to move different distances upon a constant cycle of operation of crank $p$. The rod $f$ is situated, in the zero position of the pointer, parallel with the rack $m$, and carries the slide $s$, the projection $t$ of which moves into a recess $u$ in the rack whereby the slide will be displaced with the rack. Through this recess there passes the metal band $v$, which (Fig. 2) is connected to the slide $s$ and is conducted over jockey pulleys to the drum $w$ of the printing wheel $k$, which is tensioned in the opposite direction of rotation by a spring. One of these pulleys, 10, is supported, by means of a pin and slot connection in an extension of rack $m$ so that when the rack moves there is a tendency for the tension in band $v$ to change. By means of the cam $x$, which cooperates with the pin supporting the pulley and causes the pulley to move laterally with respect to the rack as the latter moves up and down, the band $v$ is maintained evenly tensioned in any position of the rack. If now prior to rotation of the crank $p$ after the article to be weighed is placed on the apparatus the price lever $i$ is adjusted on the setting of the price lever in accordance with the price per lb., the rack $m$, by means of the transmission $y$, and the slide $s$ controlled thereby will be displaced in proportion to the setting of the price lever.

In the position shown in the drawings the price lever is located at the minimum price. Upon each weighing operation the slide $s$ will accordingly describe an arc, which is of greater or smaller size dependent on the price per lb. and the extent of movement of the pointer. The slide $s$ pulls upon the band $v$ secured to the same, and this pull, transmitted by the band to the printing wheel sets the latter according to the chord of the particular arc—for example, at a price of 50 cents per lb. and 2 lbs. in weight to the chord $z$ of the arc $aa$, and at a price of $1.00 per lb. and 1 lb. in weight to the chord $bb$ of the arc $cc$ (Fig. 2). Were it techincally possible to effect a pull according to the arc instead of the chord, the movement of the printing wheel would be accurately proportional to the size of the arc, and accordingly proportional to the result derived from weight angle and price radius. The invention solves the difficulty by compensating for the difference between arc and chord, as the chord $z$ is not equal to the chord $bb$, although the length of the arc $aa$ is equal to the length of the arc $cc$. Figs. 2 and 3 show how the movement according to the chord may be made equal to the movement which conforms to the arc. The aforementioned rod $g$ (see Fig. 3) which is rotatably mounted for movement about the same axis as rod $f$ and the pointer and pendulum assembly has the same zero position as the rod $f$ and pointer $e$. The rod $g$ carries a slide $dd$. This slide is also displaced together with the slide $s$ by the rack $m$. The slide $s$ exerts a pull on a metal band $ee$, which also passes over a second tensioning roll 12 similar to roll 10 and also cooperating with the cam slot $x$, and in turn is secured to the holder of a roll $ff$. The band $v$, which moves the printing wheel $k$, is looped over the roll $ff$, so that, if this roll is moved bodily, it will effect movement of band $v$ and accordingly cause additional or compensating movement of the printing wheel. The rod $f$ has, rigidly connected therewith, the segment $gg$ (Fig. 2), which rotates the cam $hh$ (Fig. 3). This cam which is properly shaped to effect the desired compensation, is accordingly rotated in conformity with the movement of the pointer, and thereby varies the position of a cooperating lever $ii$ in proportion to the difference between arc and cord.

This difference is transmitted by means of the lever $ii$ to the second rod $g$ which is rigidly connected to said latter lever and, therefore, in turn, performs a movement varying in proportion to the difference between chord and arc. Since now the slide $dd$ of the rod $g$ is displaced in proportion to the price per lb., the second band $ee$ is accorded a pull, which is always proportional in its variation to the chord and arc difference and radius, i. e., price per lb. Since the second band $ee$ pulls correspondingly on the first band $v$ by means of the roll $ff$, and this pull is always proportional to the difference between chord and arc, and upon proper selection of the transmission ratio equal to this difference, the band $v$ gives the printing wheel an additional compensating movement to correct for the difference between the arc and the chord. The printing wheel accordingly always rotates in proportion to the arc result derived from the weight angle and the price radius.

It will be understood that no restriction is made to the specific form of embodiment shown in the drawings, but that various modifications are quite possible within the meaning of the above description and the annexed claims without departing from the spirit of the invention.

What I claim as new and desire to secure by Letters Patent is:

1. A computing scale having an angularly deflecting member with means for deflecting the same according to a weighing load whose weight forms one factor of a computation, a settable member settable to different positions according to a second factor of the computation, means controlled by the settable member for selecting a point on the deflecting member according to the setting of the settable member, means for measuring the arc described by the selected point on the deflecting member, a registering device and means for operating the same to register the result of the computation as a function of the length of the measured arc.

2. A computing scale having an angularly deflecting member with means for deflecting the same according to a weighing load whose weight forms one factor of a computation, a settable member settable to different positions according to a second factor of the computation, means controlled by the settable member for selecting a point on the deflecting member according to the setting of the settable member, a registering device, means for measuring the chord joining the initial position of the selected point and the final position thereof after the deflecting member has been deflected by the load, means for measuring the difference between said chord and its arc and means controlled conjointly by both of said measuring means for controlling the registering device to register the result of the computation as a mathematical function of the length of the arc.

3. A price computing scale having a deflecting member pivoted at one end and means for angularly displacing the same about its pivot in proportion to the weight of a load placed on the scale, a settable member settable to different positions representative of different unit prices, a mounting member pivoted concentrically with the deflecting member, a displaceable member carried by the mounting member and controlled by the settable member for radial movement in proportion to different unit prices, means for moving said displaceable member through an angular distance corresponding to the angular displacement of the deflecting member, a registering device and means for operating the same to register the total price according to the arc through which said displaceable member travels, said operating means including a flexible connection between the device and displaceable member for moving the device according to the chord of the arc described by the displaceable member, a cam controlled for operation by the displaceable member according to the angle of displacement of the latter, and means operated under control of the cam for additionally moving the device in accordance with the difference between the arc described by the displaceable member and the chord of said arc.

4. A price computing scale having a deflecting member pivoted at one end and means for angularly displacing the same about its pivot in proportion to the weight of a load placed on the scale, a settable member settable to different positions representative of different unit prices, a mounting member pivoted concentrically with the deflecting member, a displaceable member carried by the mounting member and controlled by the settable member for radial movement in proportion to different unit prices, means for moving said displaceable member through an angular distance corresponding to the angular displacement of the deflecting member, a registering device for registering total price and means for operating the same controlled by the displaceable member and comprising means operated according to the chord subtended by the arc described by said displaceable member and compensating means for correcting for the difference in length between the arc and the chord.

5. A price computing scale having a deflecting member pivoted at one end and means for angularly displacing the same about its pivot from a normal zero line in proportion to the weight of a load placed upon the scale, a slide member carried by a member pivoted concentrically with the deflecting member, unit price setting means for moving said slide member radially according to different unit prices, a registering device and controlling connections between the slide member and the registering device, means for moving said slide member from its position on the normal zero line to a position adjacent the deflecting member in a weight indicating position and compensating devices in said controlling connections to cause said slide member to affect the registering device according to its arcuate travel from the normal zero line.

6. A computing scale having a deflecting member pivoted at one end and means for angularly displacing the same about its pivot in proportion to the weight of a load placed upon the scale, a mounting member pivoted concentrically with the deflecting member, a slide member slidably carried by the mounting member and means for moving the slide member radially to select different unit prices, a register wheel to represent total price by its position, an operating band connecting said slidable member to said register wheel, means for moving said slidable member an angular distance equal to the angular displacement of said deflecting member and compensating means for adjusting the movement of said band according to the radial position of said slidable member.

7. The invention according to claim 6 in which the compensating means comprises a cam for moving a guide roller for the operating band to maintain a constant tension in the band as the slidable member is moved radially on the pivoted mounting member.

8. The invention according to claim 6 in which the compensating means comprises a roll over which the band is looped, means for moving said roll in unison with the slidable member when the latter is moved radially and a fixed cam for automatically adjusting the roll laterally as it is moved in unison with the slidable member.

ADOLF WEISSENBURGER.